March 11, 1969

H. C. SCHUTT 3,432,399

STILL AND COLUMN WITH SUBMERGED COMBUSTION
BURNERS IN THE STILL

Filed Jan. 30, 1967

Hermann C. Schutt
INVENTOR.

BY John E. Toupal
ATTORNEY.

United States Patent Office 3,432,399
Patented Mar. 11, 1969

3,432,399
STILL AND COLUMN WITH SUBMERGED COMBUSTION BURNERS IN THE STILL
Hermann C. Schutt, Framingham, Mass., assignor to The Fluor Corporation, Ltd., Los Angeles, Calif., a corporation of California
Filed Jan. 30, 1967, Ser. No. 612,721
U.S. Cl. 202—153                                1 Claim
Int. Cl. B01d 3/32, 3/16

ABSTRACT OF THE DISCLOSURE

Still and column apparatus for treating water contaminated with organic chemicals e.g., hydrocarbons, alcohols, ethers, aldehydes and amino compounds. The apparatus comprises a column connected at the top with a reflux condenser and communicating at the bottom with a tank-still containing the contaminated water to be treated, the tank-still being equipped with submerged combustion burners arranged at opposite sides of the still and adapted to heat the water therein, the combustions products and volatilized materials being discharged upwardly of the column, the column comprising vertically stacked trays each formed by spaced apart parallel angle irons.

---

This invention relates to a method and apparatus for the treatment of process water contaminated with dissolved hydrocarbons and/or organic chemicals as synthesized in modern petrochemical plants, such as aldehyde, alcohols, ethers, and amino compounds.

The oil refining and chemical industries use considerable amounts of relatively pure water in their processing plants where crude oil or its distillates are converted into high grade combustibles or chemicals. In modern oil refineries steam is used mainly as an aid in distillation processes; in petrochemical plants the primary conversion process of light hydrocarbons and petroleum distillates for the production of synthesis gas, olefins, diolefins, and other reactive hydrocarbons, requires considerable amounts of process steam, and the necessity of rapidly cooling the conversion products, usually accomplished by water injection, augments the use of fresh water in this basic process step. In the recovery and/or refining process of chemicals or their precursors, steam is also applied in varying amounts depending on the operation conditions inherent to the processing method.

The process water is usually separated from the hydrocarbon mixture by cooling and condensation. The uncondensed, more volatile materials are withdrawn from a receiver as gas or vapor, and the condensate is allowed to settle by gravity forming an oil and an aqueous layer; the latter, comprising most of the steam or fresh water used in the manufacturing process, is often referred to as waste process water.

The waste process water may contain in suspension some solid materials such as carbon particles, catalyst fines, etc. These may be removed by filtration, extended settling time or flotation accelerated by special chemical agents and aeration. The waste process water may further contain some normally-liquid hydrocarbons in suspension, a state usually characterized as an emulsion. These hydrocarbons can be removed by passing the waste water stream through a coalescer which effects agglomeration of the suspended liquid particles so that they respond to gravitational separation in a settling tank or basin. The prior art on these treatments of waste process water is extensive and has received consideration in the modern design of the well-known API separator to be found in every refinery and petrochemical plant. The separator, however, does not remove compounds which are in true solution.

All species of hydrocarbons exhibit some solubility in water which generally decreases with increasing molecular weight of the hydrocarbon. In the ambient to 212° F. temperature range and at atmospheric pressure, the rank in solubility among the hydrocarbons containing the same number of carbon atoms per molecule is in general: aromatics>cyclodiolefins>diolefins and cyclo-olefins>olefins and cycloparaffins>paraffins. The hydrocarbons are in true solution but in low concentration. The phase behavior pattern is decidedly nonideal, i.e., deviates greatly from Raoult's law. A factor, usually termed activity coefficient, is applied to the ideal phase relationship, and this coefficient is extremely high for the aqueous solution in question, thus facilitating the separation of the solute from the solvent.

Solubilities and associated activity coefficients are given for the principal hydrocarbon contaminants in Table I and for residual, dissolved, oxygenated compounds in Table II. The solubility and consequently the activity coefficient vary, of course, with the temperature and also with the pH of the solution. The product of activity coefficient and vapor pressure of the pure compound is frequently referred to as pseudovapor pressure which characterizes its tendency to escape from the solution. The data cited in Tables I and II relate to pure water as solvent and to temperatures in the order of 160–170° F., a temperature level employed in the main phase of the recovery process, the subject of this invention.

TABLE I

|  | Formula | Atmospheric boil. range, °F. | Solubility (160–170° F.) p.p.m. by wt. | Activity coeff. $\times 10^{-3}$ |
|---|---|---|---|---|
| Aromatics: |  |  |  |  |
| Benzene | $C_6H_6$ | 176 | 2,450 | 1.7 |
| Toluene | $C_7H_8$ | 231 | 765 | 6.7 |
| Xylenes | $C_8H_{10}$ | 281–292 | 360–380 | 16.0 |
| Ethyl benzene | $C_8H_{10}$ | 277 | 340 | 17.3 |
| Styrene | $C_8H_8$ | 293 | 945 | 6.1 |
| Methyl styrenes | $C_9H_{10}$ | 334–340 | 500–530 | 12.7 |
| Cyclodiolefins | $C_6H_8$–$C_8H_{12}$ | 177–280 | 700–50 | 6.4–120 |
| Cyclo-olefins | $C_6H_{10}$–$C_8H_{14}$ | 181–280 | 140–10 | 32.5–610 |
| Diolefins | $C_6H_{10}$–$C_8H_{14}$ | 133–270 | 150–10 | 30.4–610 |
| Cycloparaffins | $C_6H_{12}$–$C_8H_{16}$ | 177–265 | 25–5 | 185–1,200 |

TABLE II

|  | n-Alcohols | Aldehydes | Ethers |
|---|---|---|---|
| Number of carbon atoms | 7–10 | 7–10 | 8–10 |
| Molecular weights | 116–158 | 114–156 | 130–158 |
| Atmospheric boiling range, °F. | 349–448 | 311–407 | 326–374 |
| Solubility, p.p.m. by weight | 2,500–75 | 1,950–50 | 290–25 |
| Activity Coefficient $\times 10^{-3}$ | 2.6–130 | 3.3–220 | 25.0–390 |

The primary object of this invention is to remove dissolved hydrocarbons and/or organic chemicals from waste process water by taking advantage of their high activity coefficients in dilute solutions and thus recovering relatively pure water for reuse.

It is a further object of this invention to carry out the purification process in a closed system to avoid air pollution, especially its contamination by aromatics or any material detrimental to human health.

Another object of the invention is to generate an intercarrier gas in sufficient quantities so that the partial pressure of the contaminants transferred from the aqueous stream to the vapor phase within the system is sufficiently low to avoid reabsorption of contaminants by the incoming water stream.

Another object of this invention is to provide the requisite energy for the separation process by combustion of fuel gas or oil, its products of combustion being discharged directly into the waste water stream which contributes to the efficiency of the separation process and simplifies the design of apparatus assembly for the commercial practice of the process.

A further object of this invention is to selectively transfer, from the aqueous solution, the contaminants to a carrier gas with essentially no vaporization or loss of the process water in the operation of the system thus maintaining a high recovery of purified water and a high overall thermal efficiency.

A further object of this invention is to provide a process unit embodying great flexibility with respect to the types of contaminants characterized by their phase behavior.

Additional objects and advantages of the present invention will become apparent to those skilled in the art from the following description taken in conjunction with the accompanying drawings wherein.

Figure 1:
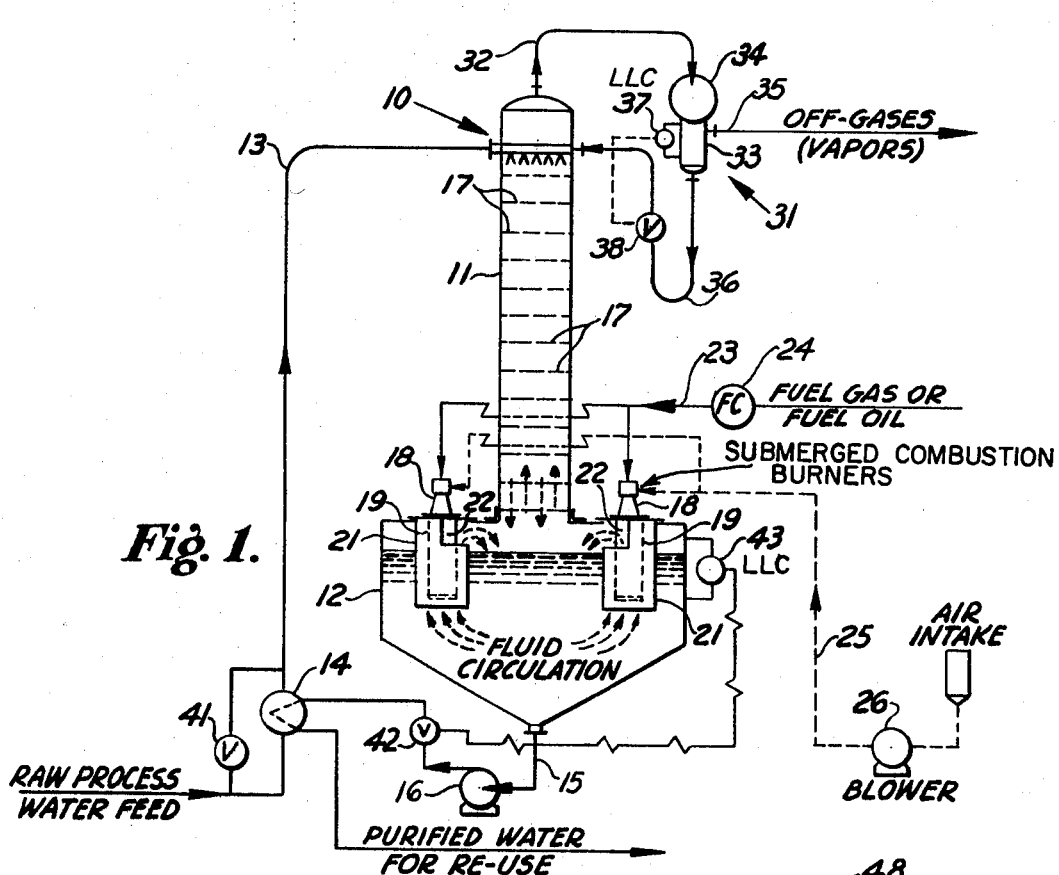
FIG. 1 is a schematic elevational view of apparatus suitable for industrial application of the invention.

Referring now to FIG. 1, there is shown the hollow, cylindrical exchange column 11 mounted above and communicating with the base tank 12. Connected between a source of raw process water and the water inlet nozzle assembly 10 in the upper portion of the column 11 is the feed line 13 which passes through the heat exchanger 14. Positioned in the water removal line 15 is the pump 16 which withdraws purified water out of the base tank 12 and through the heat exchanger 14. The fluid permeable decks 17 are stacked throughout the column 11 in a spaced apart, parallel relationship.

The burners 18 are supported by and project into the base tank 12. Extending downwardly from each burner 18 is a hollow, open bottomed downcomer 19 surrounded by a concentric pipe 21 having in its upper surface a 180-degree weir opening 22 facing the column 11. Operatively connected to the burners 18 are both the fuel line 23 with the associated flow controller 24 and the air intake line 25 with the associated blower 26. The burners 18 are commonly known as submerged combustion burners and are of the same general type as shown in U.S. Patent No. 3,138,150.

The discharge apparatus 31 is connected to the top of the column 11 by the discharge line 32. Included in the discharge apparatus 31 is the reservoir 33 mounted beneath the cooler-condenser 34. Communicating with the reservoir 33 are the offline 35 for removal of gases and vapors and the return line 36 connected to the nozzle assembly 10. The controller 37 maintains a desired liquid level in the reservoir 33 by controlling the valve 38 in the return line 36.

During operation, the waste process or raw water is preheated by the effluent or purified water in the heat exchanger 14. Part of the raw water can bypass the exchanger 14 by passing through the bypass valve 41 in order to control the temperature of the raw water entering the top of the column as required by the types and amounts of contaminants. The transfer to and retention of the solute, hydrocarbons or organics, in the vapor phase are effected by a carrier gas which is generated in the base tank 12 on which the column 11 is mounted. The carrier gas is derived from the combustion of fuel gas or oil which is burned with a minimum amount of excess air required for complete combustion in the burners 18. The dry or inert combustion products should not contain more than 1.2 percent of oxygen. The amount of fuel burned is governed by the concentration and phase behavior pattern of the contaminant to be removed. The temperature in the base tank is controlled by adjusting the temperature of the raw process water entering the column, as described above. The proper temperature will vary from case to case, and only temperature ranges can be cited based on application of the process.

The vapors leaving the top of the column through the discharge line 32 are cooled and partially condensed in the cooler-condenser 34 and returned to the column 11 for combination with the raw water in its downward passage thereby retaining the maximum amount of water in the system. The condenser 34 may be mounted above the column 11 which permits gravity induced return of the condensate or may be located at any other appropriate elevation for separating the condensate which is then returned to the top of the column by means of a pump.

The uncondensed materials comprising the inert or carrier gas, the contaminants removed from the raw water, and some water vapors approximately equivalent to those produced in the combustion process are then discharged through the offline 35 into the plant flare system or the combustion chamber of a furnace or boiler where the contaminants are burned or completely oxidized and released with other inert materials into the atmosphere.

The liquid descending in the column 11 which is equipped with trays or packing, is in intimate contact with the ascending gases and vapors to effect the required heat and mass transfer for driving the contaminants out of solution. It maintains a marked temperature differential between the top of the colmun 11 and the base tank 12, in the range of 30 to 70° F., the exact temperature pattern being dependent on the composition and the pseudovapor pressure of the solute, to effect a high thermodynamic efficiency. Transfer of hydrocarbons and other contaminants of the process water entering at the top of the column 11 takes place at relatively high solute concentrations and low temperatures, in the order of 150–180° F., so that the amount of water vapor contained in the off-gases is kept at a minimum. The proper temperature at the top of the column is maintained by regulating the temperature of the raw water feed to the column 11 in conjunction with the temperature maintained in the base tank 12.

The transfer of hydrocarbons in the lower part of the column 11 is abetted by the large volume of steam and inert gases leaving the base tank 12. Most of the steam is recondensed in the column 11 imparting its heat to the descending liquid, thus effecting a high thermal efficiency of the process system. The final disengagement or transfer of contaminants from the water takes place in the base tank 12 where temperatures in the order of 185–225° F. are maintained, depending again on the nature of the contaminants, by direct application of combustion heat. The amount of fuel burned and carrier gas generated is maintained at a constant, predetermined value by means of the flow controller 24 in the fuel gas supply line 23. The burner assembly is of special design which induces a high rate of liquid circulation in contact with the hot combustion gases, resulting in a large interfacial area and transient high temperatures at the gas-liquid boundaries, thus intensifying the heat and mass transfer. The combustion gases, issuing from the burner muffle or downcomer 19 at relatively high velocity, pass upward through the annular space formed by a surrounding and concentric pipe 21 of approximately twice the diameter of the downcomer 19 and having a 180-degree weir opening 22 at the top. At the normal liquid level maintained in the tank 12, water enters at the bottom of the annular passage and is lifted over the weir opening 22 which faces the liquid stream issuing from the column 11 being in open communication with the base tank. The desired liquid level is maintained by emptying purified water from the quiescent zone at the bottom of the tank 12 at a flow rate determined by the valve 42 which is controlled by the liquid level controller 43. Two or more burner assemblies 18 may be applied depending on the amount of waste process water to be treated; they are then arranged concentrically to the column 11 with overflow weir openings 22 facing the downcoming liquid stream.

Figure 2:
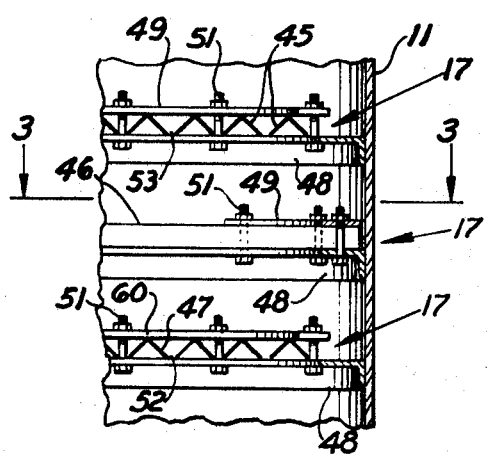
FIG. 2 is a partial, cross sectional view of preferred deck assemblies for use in the apparatus of FIG. 1.
Figure 3:
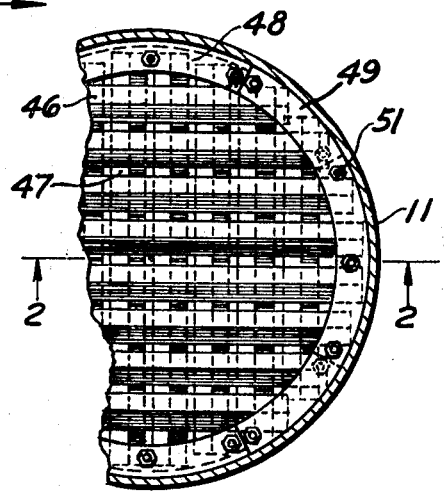
FIG. 3 is a partial, cross sectional view taken along line—3—3 of FIG. 2.

The pressure in the base tank 12 should be as low as possible, and the means provided in the column 11 for vapor-liquid contacting as well as the partial condenser 34 in the overhead vapor-stream are designed for relatively low pressure drop but are consistent with the required efficiency of the heat and mass transfer processes. For relatively small capacity units handling up to 150 gallons per minute of raw water, a column equipped with packing, such as Stedman or Pall rings, may be provided. For larger units the column may be equipped with conventional fractionating trays but preferably with the grid decks 17 illustrated in FIGURE 2 which are uniquely suited for this application because of their low liquid holdup and pressure drop. With these decks, the pressure in the base tank 12 would normally not exceed 20 p.s.i.a. for large capacity units. As shown, these decks are parallel and vertically spaced apart. Each deck consists of a plurality of parallelly oriented, downwardly opening angle irons 45, 46 or 47 equally space in a horizontal plane and resting on an annular support bracket 48. The angle irons are retained by the arcuate bars 49 secured to the brackets 48 by the nut and bolt assemblies 51. The resulting openings 52 or 53 permit the simultaneous passage and intimate contacting of descending liquid and ascending gases. The sloping walls of the angle iron allow for a variable holdup of liquid resulting in a wide range of stable operating conditions. The area of the openings referred to as the free area per deck may be either equal or variable for every deck. As illustrated, the angle irons 46 in one deck 17 are perpendicular to the angle irons 45 and 47 in adjacent decks 17.

Hydrocarbons with atmospheric boiling points as high as 400° F. which may be dissolved in the process water in measurable quantities can be removed at a temperature level of 180–210° F. in the base tank 12 and 150 to 160° F. at the top of the column 11, i.e., a temperature level throughout the system considerably below the boiling point of water. The residual hydrocarbons in the treated water amount to 5 p.p.m. or less.

Some organic chemicals, oxygenated hydrocarbons in particular, such as higher molecular weight alcohols, aldehydes, ethers, and ketones, which are partially soluble in water, as shown in Table II, also exhibit high activity coefficients in dilute solutions and therefore respond to this treating method.

To convey a complete understanding of the objectives of this invention, a typical application of the process is given in the following example.

The waste process water from a basic petrochemical plant involving pyrolysis of petroleum distillates, recovery of olefins and associated by-products usually contains 1,200 p.p.m. of hydrocarbons in true solution after having been passed through a modern API separator. The concentration of various species of dissolved hydrocarbons is as follows: Benzene, 850 p.p.m.; alkyl benzenes, 160 p.p.m.; styrenes, 50 p.p.m.; diolefins and olefins, mostly cyclic, 140 p.p.m. This raw water was processed in the aforedescribed apparatus at a rate of 500 gallons per minute or 250,000 pounds per hour, and its hydrocarbon content was reduced to less than 5 p.p.m. under operating conditions summarized in Table III.

TABLE III

|  | P.s.i.a. | ° F. |
|---|---|---|
| Pressures and temperatures: |  |  |
| Raw water feed (pH=6.2 to 6.4) |  | 175 |
| Base tank | 19.8 | 205 |
| Top of column | 18.5 | 180 |
| Effluent from overhead condenser | 15.8 | 152 |
| Fuel gas burned, s.c.f./hr | 11,100 |  |
| Heat release (basis LHV), B.t.u./hr | 10,200,000 |  |
| Efficiency in use of fuel gas, percent | 97.1 |  |
| Treated water recovered, lb./hr | 249,300 |  |

If a lower temperature is maintained in the base tank, i.e., 200° F., and the heat released by the burner reduced correspondingly, the residual hydrocarbons, mostly benzene, in the treated water increase to approximately 8–9 p.p.m. This effect can be countermanded by reducing the feed temperature, thus restoring the heat input of the burners and the amount of inert gases generated to their former values.

Obviously, many modifications and variations of the present invention are possible in light of the above teachings. It is, therefore, to be understood that within the scope of the appended claim the invention may be practiced otherwise than as specifically described.

What is claimed is:

1. A closed waste water processing apparatus comprising a fluid collection tank, an exchange column forming a top enclosure for said tank and extending centrally thereabove, fluid inlet means adapted to introduce waste water into the upper portion of said column for passage downwardly therethrough, a plurality of submerged combustion burners arranged in said tank at opposite sides thereof and spaced from the bottom of said column, said combustion burners adapted to heat waste water in said tank and to discharge produced combustion products upwardly through said column for contact with water descending therein, discharge means connected to the upper portion of said column and adapted to receive contaminants removed from said waste water, said discharge means comprising a cooler means adapted to condense water vapor mixed with the discharged contaminants and fluid return means connected between said cooler means and said column, mass transfer means disposed in said column and comprising a plurality of vertically stacked trays each formed by spaced apart substantially parallel angle irons and having the same free area, the angle irons forming each said tray being in nonparallel alignment with the angle irons forming an adjacent tray, fluid outlet means for removing purified water from the lower portion of said tank, and liquid level control means for controlling the flow of purified water out of said tank through said fluid outlet means.

References Cited

UNITED STATES PATENTS

| 2,303,811 | 12/1942 | Badenhausen | 159—18 X |
| 2,756,029 | 7/1956 | Brogdon. |  |
| 2,759,328 | 8/1956 | Cockrell. |  |
| 2,781,635 | 2/1957 | Brogdon. |  |
| 2,856,074 | 10/1958 | Dubitzky | 210—175 |
| 2,890,166 | 6/1959 | Heinze. |  |
| 2,921,004 | 1/1960 | Wood | 202—177 |
| 3,165,452 | 1/1965 | Williams | 203—11 |
| 3,300,392 | 1/1967 | Ross et al. | 203—7 |

FOREIGN PATENTS

| 349,567 | 5/1931 | Great Britain. |

NORMAN YUDKOFF, *Primary Examiner.*

F. E. DRUMMOND, *Assistant Examiner.*

U.S. Cl. X.R.

203—10, 49; 202—181; 159—16